US011529582B2

(12) United States Patent
Pontonio et al.

(10) Patent No.: US 11,529,582 B2
(45) Date of Patent: Dec. 20, 2022

(54) TUNABLE ADSORBENTS

(71) Applicants: Steven J. Pontonio, Eden, NY (US); Neil A. Stephenson, E. Amherst, NY (US); Philip A. Barrett, Tonawanda, NY (US); Nicholas R. Stuckert, Grand Island, NY (US)

(72) Inventors: Steven J. Pontonio, Eden, NY (US); Neil A. Stephenson, E. Amherst, NY (US); Philip A. Barrett, Tonawanda, NY (US); Nicholas R. Stuckert, Grand Island, NY (US)

(73) Assignee: PRAXAIR TECHNOLOGY, INC., Danbury, CT (US)

( * ) Notice: Subject to any disclaimer, the term of this patent is extended or adjusted under 35 U.S.C. 154(b) by 287 days.

(21) Appl. No.: 16/880,324

(22) Filed: May 21, 2020

(65) Prior Publication Data
US 2020/0276534 A1    Sep. 3, 2020

Related U.S. Application Data

(62) Division of application No. 15/431,164, filed on Feb. 13, 2017, now Pat. No. 10,717,035.

(51) Int. Cl.
| | | |
|---|---|---|
| *B01D 53/04* | (2006.01) | |
| *B01J 20/18* | (2006.01) | |
| *B01J 20/30* | (2006.01) | |
| *B01J 20/28* | (2006.01) | |

(52) U.S. Cl.
CPC ............ *B01D 53/04* (2013.01); *B01J 20/183* (2013.01); *B01J 20/186* (2013.01); *B01J 20/2803* (2013.01); *B01J 20/2808* (2013.01); *B01J 20/28026* (2013.01); *B01J 20/28097* (2013.01); *B01J 20/3007* (2013.01); *B01J 20/3028* (2013.01); *B01J 20/3042* (2013.01); *B01J 20/3078* (2013.01); *B01D 2253/108* (2013.01); *B01D 2253/25* (2013.01); *B01D 2253/308* (2013.01); *B01D 2253/311* (2013.01); *B01D 2257/102* (2013.01); *B01D 2257/104* (2013.01); *B01D 2257/502* (2013.01); *B01D 2257/504* (2013.01); *B01D 2257/7025* (2013.01)

(58) Field of Classification Search
CPC .......... B01D 2253/108; B01D 2253/25; B01D 2253/308; B01D 2253/311; B01D 2256/245; B01D 2257/102; B01D 2257/104; B01D 2257/502; B01D 2257/504; B01D 2257/7025; B01D 53/02; B01D 53/04; B01J 20/183; B01J 20/186; B01J 20/28026; B01J 20/2803; B01J 20/2808; B01J 20/28097; B01J 20/3007; B01J 20/3028; B01J 20/3042; B01J 20/3078; Y02C 20/20; Y02C 20/40
See application file for complete search history.

(56) References Cited

U.S. PATENT DOCUMENTS

| | | | |
|---|---|---|---|
| 4,477,583 A | 10/1984 | Rodewald | |
| 6,878,657 B2 | 4/2005 | Jasra et al. | |
| 7,455,718 B2 | 11/2008 | Ackley et al. | |
| 2005/0137443 A1* | 6/2005 | Gorawara | C01B 3/56 585/823 |
| 2006/0052344 A1 | 3/2006 | Beeckman et al. | |
| 2013/0340614 A1 | 12/2013 | Barrett et al. | |
| 2013/0340615 A1 | 12/2013 | Barrett et al. | |
| 2014/0221702 A1 | 8/2014 | Weston et al. | |
| 2015/0343417 A1 | 12/2015 | Puranik et al. | |
| 2016/0051971 A1* | 2/2016 | Choi | C10G 45/60 585/431 |

FOREIGN PATENT DOCUMENTS

| | | |
|---|---|---|
| EP | 0700718 A1 | 3/1996 |
| WO | WO2010/109477 | 9/2010 |

OTHER PUBLICATIONS

Bolton, A.P., "Molecular Sieve Zeolites", in Experimental Methods in Catalytic Research, vol. II, ed. R.B. Anderson and P.T. Dawson, Academic Press, New York 1976.

* cited by examiner

*Primary Examiner* — Christopher P Jones
(74) *Attorney, Agent, or Firm* — Ralph J. Mancini

(57) ABSTRACT

The present invention relates to a method for modifying the crystalline inorganic framework of an adsorbent with coatings to provide rate selectivity for one gas over others is described. The method described herein narrows the effective pore size of crystalline porous solids with pores less than about 5 Å for rate selective separations. This method of the invention comprises treating the hydrated or partially hydrated zeolite with a silicone derived binding agent followed by subsequent heat treatment. The additive content and treatment are adjusted to match effective pore size to specific separations. The superior adsorbent has the added convenience of bead forming simultaneously with pore modification as well as having the treatment result in the yielding of high crush strength products.

16 Claims, 5 Drawing Sheets

TUNABLE ADSORBENTS

CROSS REFERENCE TO RELATED APPLICATION

The present application is a Divisional Application and claims the benefit of and priority to allowed U.S. patent application Ser. No. 15/431,164 filed on Feb. 13, 2017, the disclosure of which is incorporated by reference herein.

FIELD OF THE INVENTION

The present invention relates to a method for modifying the crystalline, inorganic framework of an adsorbent with coatings to provide rate selectivity for one gas over others is described.

BACKGROUND OF THE INVENTION

There is a general need in the art for a superior method for the selective adsorption of gases on the basis of their size difference. Zeolites have been successfully used as molecular sieves for this purpose due to their pore size being similar to the typical size of the gases being separated. Modification of the pore sizes of these zeolites is typically achieved by the exchange of cations. For example, an A zeolite with Na cations has a pore aperture of ~4 Å. Ion exchanging the Na cations with K or Ca results in a pore size of ~3 and 5 Å, respectively. However, this method of pore size modification has its limitations in that it is not as effective for separating molecules whose size difference falls within that which an ion exchange can achieve. For example, commercially available 4 Å, also known as NaA, has a pore size of ~4 Å which is large enough to adsorb both $N_2$ and $CH_4$, which have kinetic diameters of 3.64 and 3.80 Å, respectively. Correspondingly, commercially available 3 A zeolite, which contains ~40-60% K balance Na, offers a pore size closer to 3 Å, which is too small to adsorb either $N_2$ or $CH_4$. Therefore, a method is needed which can fine tune the effective pore mouth opening of the zeolite which can subsequently improve the selectivity of one gas over another, which in this example is $N_2$ over $CH_4$.

Another separation where the method of the invention can prove quite useful is $CO_2$ separation from CO gas, such as the removal of $CO_2$ from a syngas containing CO. Since $CO_2$ and CO have kinetic diameters of 3.3 and 3.7 Å respectively, the same situation occurs where 4 Å zeolite readily adsorbs both gases and 3 A zeolite has a pore mouth which is too small to adsorb either component.

Still another separation is $CO_2$ separation from $N_2$ gas having the aforementioned kinetic diameter differences. This invention will have a strong benefit especially in the case of high removal rates of $CO_2$ to low volume fractions (<10%) where $N_2$ or CO can co-adsorb and reduce the available adsorption sites on traditional adsorbents but will be limited in this present invention.

The teachings of the prior art have addressed the use of silica as a means of coating a zeolite surface to modify the existing pore size. However, the teachings have been limited either in the scope of the pore size change and/or in the method to which the pore is reduced. Those skilled in the art will recognize that previous teachings do not address the specific recipe or processing conditions contained in this patent that are used to control the ultimate effective pore size.

U.S. Pat. No. 6,878,657 controls pore aperture size of zeolite A depositing a silica coating on the external surface of the zeolite. Specifically, the sorption of several gases including nitrogen, oxygen, and argon on silica treated zeolite A was studied. Sorption of these gases by zeolite A which was treated by various quantities of tetraethyl orthosilicate (TEOS) showed that sorption of argon, nitrogen, and oxygen decreased with increasing silica coating with the effects greatest for argon and least for oxygen. While this patent teaches the separation of $O_2$ from $N_2$ and argon, it does not recognize any real benefit in separating nitrogen and argon. The present invention amongst other things allows for the separation of nitrogen and methane, despite their very close size difference (3.64 vs. 3.80 Å). The sample preparation is also significantly different in that the U.S. Pat. No. 6,878,657 stresses the need to pre-dry the zeolite before introducing the TEOS in dry toluene. The present invention uses silicone resin emulsion which coats among other materials a zeolite powder which can be dried. Another important distinction of the present versus the prior art is the fact that the silicone resin coating used in the present invention can also act as a binding agent for the composition for agglomeration. In the prior art, the amount of coating of TEOS taught for the effective pore size reduction is sufficient to effectively bind agglomerates and provide sufficient crush strength. Accordingly the amount of TEOS used in the formulation can range up to 1% of the zeolite weight used. If the average crystal size of the 4 A zeolite is 2 microns, then using 1% by weight TEOS would equate to an average crystal coating thickness of 120 Å of TEOS before calcination. In the present invention, the amount of silicone resin used in the examples would be enough to coat the 4 A crystals with an average of 980 Å, assuming similar 2 micron sized crystals.

WO 2010/109477 A2 discloses the selective separation of carbon dioxide from a gaseous mixture with nitrogen. The adsorbent material is prepared by pre-drying zeolite A powder followed by treatment with tetra alkyl ortho silicate dissolved in dry solvent. The coated zeolite is then calcined to convert the silicate coating to silica. A second embodiment for the zeolite includes cation exchange to potassium which decreases the A pore size to ~3 Å and allows for the separation of $CO_2$ and $N_2$. The present invention differs in that the treatment method for the pore mouth modification coating of the zeolite includes silicone resin coating of the undried zeolite. The present invention also does not find the necessity of an ion exchange for additional pore size modification. Finally, the present invention claims gas separation beyond $CO_2/N_2$ and includes other, more difficult, separations.

U.S. Pat. No. 4,477,583 describes a method for depositing a coating of silica on a crystalline zeolite. The coated material is employed as a catalyst for the selective production of para-dialkyl substituted benzenes. This patent also refers to zeolites which specifically adsorb benzene, including the class of ZSM zeolites. The present invention differs from this prior art in that the coated zeolite is not used as a catalyst for benzene adsorption. This invention refers to the pore size reduction to <5 Å to facilitate a size selective adsorption of one gas over another. The '583 patent contains no reference to pore size consideration, and only generally refers to the use of the coating as a catalyst for benzene production. Additionally, the preferred zeolites are those having a framework density of not below 1.6 cubic centimeters. This would exclude the zeolite A, which has a framework density of 1.3 cubic centimeters. In the present invention, zeolite A is the most preferred zeolite to be used as the starting material for pore reduction, since the pore size is between 3 and 5 Å, depending of the cation type.

U.S. application 2013/0340615 A1 refers to adsorbent compositions using silicone-derived binding agents, which are shown to possess superior pore structures which enhance the rate of gas adsorption in the agglomerate. The properties of the final composition, including mean pore diameter, macropore size, and crush strength are addressed, but there is no mention of the change in micropore size of the zeolite as a result of the zeolite and silicon-derived binding agent mixture. In fact, this application does not acknowledge the advantages of the silicone as a tool for coating the individual zeolite crystals to be used as a means of modifying the pore size to facilitate the size selective separation of different gases.

U.S. application 2015/343417 discloses a method for modifying the surface of zeolites to form apertures smaller than 4.4 Å without a reduction of the pore volume. It specifically refers to the use of zeolite type A for drying moist refrigerants such as R11, 123, and R134a. It also refers to the use of tetra-ethyl-ortho-silicate as the modifying agent and the use of additional clay type binders to help bind the material to form agglomerates. As with the previously mentioned prior art, it does not address the use of silicone resins as the modifying agent and its' use as a binder, as well as the modifying agent. The present invention also has the additional feature of identifying the effect of the changing calcination temperature on the apparent pore size aperture and subsequently on the size selectivity. The present invention, as indicated in the following description and examples, has a more simplistic preparation, making it more amenable to a large scale commercial manufacturing processes.

SUMMARY OF THE INVENTION

The present invention relates to a method for modifying the crystalline inorganic framework of an adsorbent with coatings formed from a silicone derived species to provide rate selectivity for one gas over others is described. Specifically, the method described herein narrows the effective pore size of crystalline porous solids with pores less than 5 Å for rate selective separations. This method of the invention comprises treating the hydrated or partially hydrated zeolite with a silicone precursor followed by subsequent heat treatment. The additive content and treatment are adjusted to match the effective pore size to specific separations. The superior adsorbent has the added convenience of agglomeration, including bead forming simultaneously with pore modification, as well as having the treatment yielding agglomerates of high crush strength.

DETAILED DESCRIPTION OF THE INVENTION

Figure 1:
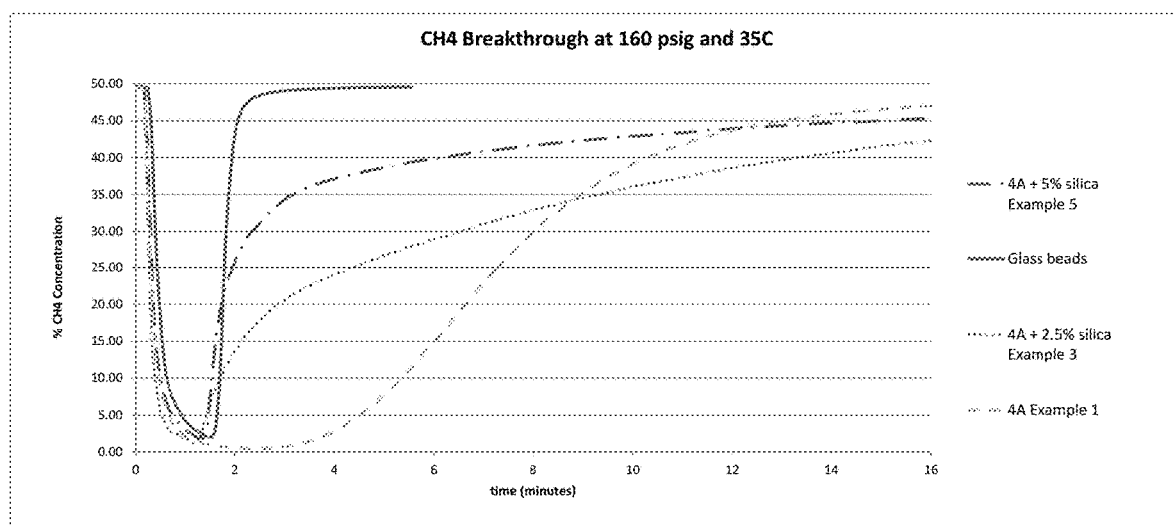
FIG. 1—Shows the $CH_4$ breakthrough results of 4 Å, 2.5% silicone-derived species coated 4 Å, 5% silica coated 4 Å, and glass beads as a reference.

The present invention relates to a method of modifying the crystalline inorganic frameworks of an adsorbent with a silicone precursor and the adsorbents obtained from said method. Crystalline inorganic adsorbent are defined as any microporous aluminosilicate having a regular arrangement of atoms in a space lattice. The invention also relates to a method for separating one or more components from a fluid stream which utilizes the adsorbents of the invention.

Zeolites are a preferred crystalline inorganic framework. Zeolites are porous crystalline aluminosilicates which comprise assemblies of $SiO_4$ and $AlO_4$ tetrahedra joined together through sharing of oxygen atoms. The general stoichiometric unit cell formula for a zeolite framework is:

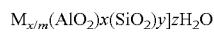

$$M_{x/m}(AlO_2)x(SiO_2)y]zH_2O$$

where M is the cation with a valence of m, z is the number of water molecules in each unit cell, and x and y are integers such that y/x is greater than or equal to 1. The ratio of oxygen atoms to combined aluminum and silicon atoms is equal to 2. Therefore, each aluminum atom introduce a negative charge of one (−1) on the zeolite framework which is balanced by that of a cation. To activate the zeolite the water molecules are completely or substantially removed by raising the temperature or pulling vacuum. This results in a framework with the remaining atoms intact producing cavities connected by channels or pores. The channel size is determined by the number of atoms which form the apertures leading to the cavities as well as cation type and position. Changing the position and type of the cation allows one to change and fine tune channel size and the properties of the zeolite, including its selectivity. For instance, the sodium form of Zeolite A has a pore size of ~4 Å and is called a 4 A molecular sieve. If at least 40% of the sodium ions are exchanged with a larger potassium ion, the pore size is reduced to ~3 Å. If these are exchanged with >70% calcium, one calcium ion replaces two sodium ions and the pore opening is increased to ~5 Å. The ability to adjust pores to precisely determine uniform openings allows for molecules smaller than its pore diameter to be adsorbed while excluding larger molecules. The Si/Al ratio can also be varied to modify the framework structure and provide selectivity required for a given separation. This is why zeolites, known as molecular sieves, are very effective in separating on the basis of size.

Some non-limiting examples of zeolites that can be employed in the context of the invention include zeolite A, X, Y, chabazite, mordenite, faujasite, clinoptilolite, ZSM-5, L, Beta, or combinations thereof. The above zeolites can be exchanged with cations including Li, Na, K, Mg, Ca, Sr, Ba, Cu, Ag, Zn, NH4+ and mixtures thereof.

In one embodiment the invention relates to modifying the pore size of a zeolite having average pore sizes less than about 5.5 Å, in another embodiment less than 5 Å, in another embodiment less than about 4.5 Å, in yet another embodiment less than about 4 Å, and in still another embodiment less than about 3.5 Å. The silicone-derived species coats the zeolite, i.e., it is on the external surface of the zeolite crystal such that it reduces the size of the aperture without substantially reducing pore volume. Small pore zeolites such as A-types zeolites are especially preferred. Other crystalline inorganic frameworks such as aluminophosphates, titanosilicates, zincosilicates can also be usefully employed in the context of the invention. The method of the invention can generally reduce starting pore sizes from about 0.1 up to about 0.8 Å, in another embodiment from 0.1 up to about 0.6 Å and in yet another embodiment from about 0.1 up to about 0.4 Å. It should be noted that these changes in the effective pore size of the zeolite cannot be directly measured. However, as noted in (Breck 1974), the effective pore size of a zeolite molecular sieve can be determined from the sizes of molecules which are or are not adsorbed under a given temperature. The apparent zeolite pore diameter will vary under different temperatures, so adsorption must be tested under similar conditions, preferably room temperature. Accordingly, this invention utilizes gas adsorption data to determine the effective aperture pore size of the coated material versus the uncoated. The uncoated version of zeolite 4 A has an effective pore size of ~4.1 Å at room temperature as determined by structural analysis. Adsorption data (see FIG. 5) indicates that $N_2$ and $CH_4$ are readily adsorbed and reach equilibrium within 12 minutes, which is expected for molecules of that size (3.64 and 3.8 Å, respectively). However, using the coated zeolite as prepared in Example 5, the adsorption data indicates that the $N_2$ again reached equilibrium within 12 minutes, but the $CH_4$ adsorption was considerably slower. This indicated that the pore size of the zeolite had been reduced to 3.8 Å or slightly lower.

The silicone derived species is derived from a silicone precursor which, after calcination, transforms to a form which become the coating and binding agent in the final agglomerated particles. The silicon-derived species must have undergone sufficient thermal or heat treatment to have volatilized substantially all of the organic side groups associated with the silicone precursor in order to leave substantially only the silicone derived species. The silicone derived species also acts as a binder eliminating the necessity of adding a separate binding agent.

Silicones are synthetic compounds comprised of polymerized or oligomerized units of silicone together with predominately carbon, hydrogen, and oxygen atoms. Silicones, also commonly known as siloxanes or polysiloxanes, are considered a hybrid of both organic and inorganic compounds since they contain organic side chains on an inorganic —Si—O—Si—O— backbone. These structures can be linear, branched, cross-linked and cage-like variants.

Silicone precursors usefully employed in the context of the invention are of formula I:

$[(R)_2SiO]n$ or of formula II:

$RSiO_{1.5}$ wherein each R substituent is the same or different and it selected from a substituted or unsubstituted organic compound. In another embodiment each R is the same or different and is selected from $C_1$ to $C_8$ organic compounds. In another embodiment each R is the same or different and is selected from straight or branched chain, substituted or unsubstituted, $C_1$ to $C_8$ alkyl, alkenyl, alkynyl, alkoxy and/or aryl groups. In another embodiment each R is independently selected from $C_1$ to $C_4$ organic compounds, including linear, branched and cyclic compounds or mixtures thereof. In yet another embodiment the silicone precursor is selected from hydroxy, methoxy, or ethoxy terminated polymeric di-methylsiloxane, methyl-silsesquioxanes, octyl-silsesquioxanes, methyl octyl-silsesquioxanes, or mixtures or combinations thereof. In another embodiment the silicone precursor is selected from polydimethylsiloxanes, polydiphenylsiloxanes, octyl silsesquioxanes methyl silsesquioxanes, (2,4, 4-trimethylpentyl) triethoxysilane and mixtures thereof. In another embodiment the silicone precursor is polymeric or oligomeric and is terminated by hydroxy, methoxy, ethoxy groups or mixtures thereof. Each R group can also represent other organic groups including, but not limited to vinyl, trifluoropropyl and the like.

The silicones of interest in the above formula I is selected such that the silicone precursor has a molecular weight ranging from about 100 to more than 500. Examples of silicones include, but are not limited to, polydimethylsiloxanes and polydiphenylsiloxanes such as those indentified by Chemical Abstracts Service (CAS) Registry Numbers 63148-62-9 and 63148-59-4 and those with di-methyl groups in polymeric forms with methyl, octyl silsesquioxanes such as CAS Registry Number of 897393-56-5 (available from Dow Corning under the designation IE 2404); methyl silsesquioxanes such as CAS Registry Number of 68554-66-5; and (2,4,4-trimethylpentyl) triethoxysilane such as CAS Registry Number 35435-21-3. Preferred silicones are selected from hydroxy, methoxy, or ethoxy terminated polymeric di-methylsiloxane or mixtures thereof with methyl-silsesquioxanes, octyl-silsesquioxanes, methyl octyl-silsesquioxanes, or mixtures thereof. There are other types of silicones which could be effective in the coating and binding process, such as using a silicone which is not an emulsion and silicones comprising of different mixtures of polymers and oligomers. One common property which any resin must have is that it coat the zeolite crystals. If the resin prefers to form its' own network, similar to clay, then this is unlikely to be effective in reducing the pore size.

Silicones of more than one type can be used and the silicones can be used with other organic or inorganic compounds. Common additional components include water, co-polymer stabilizing agents, emulsifying agents and surfactants and silicone emulsions and suspensions can be employed as the silicone binder precursors. These additional components are often present to stabilize the particular form of the silicone which is typically used in the form of an emulsion, solution, or resin.

Typical manufacturing processes for making adsorbents require a heat treatment step generally known as calcination. Calcination is a thermal treatment intended to bring about one or more of; thermal decomposition, phase transition, or removal of volatile fractions (partial or complete) depending on the final material and its intended use. The calcination process is normally conducted in presence of air and takes place at temperatures below the melting point of the active component(s). The adsorbent compositions of this invention are prepared with a suitable thermal treatment process that is effective to remove substantially all of the volatile matter associated with the silicone-derived coating agents and any temporary organic binders used as processing aids. The thermal treatment should also remove substantially all of the water and other volatile components from the zeolite micropores.

During the heating process, the silicone precursor transforms into a species that not only exhibits some binding characteristics, which aids in the formation of agglomerates, it also allows for the pore size modification of the desired crystalline inorganic framework. As used herein, "silicone-derived species" is intended to describe the silicone precursor that has undergone sufficient thermal or heat treatment to have volatilized substantially all of the organic side groups associated with the starting silicone precursor and leaving a silicone-derived species. It is believed that the silicones are transformed by the heat treatment into a new silicon containing species having a modified chemical composition which is extremely effective as coating agents for adsorbent particles, especially zeolite or zeolite-like compositions, and provide sufficient strength to the agglomerates at concentrations of 10% or less, preferably 7% or less, and more preferably 3 to 5% calculated on a dry weight final product basis. It is believed that substantially all of the organic side groups are lost while the residual inorganic Si and O atom backbone is retained serving as the core of the coating and binding agent for the adsorbent particles.

The method of the invention is capable of yielding agglomerated particles having crush strengths of equal to or greater than 0.7 lbF as measured on particles of 1.0 mm mean size using the individual bead crush strength method.

The method of the invention modifies the crystalline inorganic framework micropores by chemically depositing molecules of the silicone derived species on the external surface of said crystalline inorganic framework, allowing a further refinement or narrowing of the pore sizes. The invention enjoys several advantages over the prior art. First, the crystalline inorganic framework which is coated does not need to be dehydrated in advance of the silicone derived coating treatment. In previous art, the zeolite must be preheated to eliminate physically adsorbed water, complicating the procedure. The prior art also requires that when using tetraethyl orthosilicate (TEOS) as a coating agent, toluene must be used as a solvent during the process. Toluene is a highly flammable chemical which can present dangers, especially in a large scale manufacturing process. In the method of the present invention, no solvent is employed, other than water which, in one embodiment can be used as the emulsifier. Another advantage of this invention is that the coating material can also be used as a binding agent for the agglomerated adsorbent particles. In prior art, the material used in the silica coating process is not mentioned as simultaneous binder, most likely due to insufficient amounts. Therefore, a separate binder must be utilized. This requires an added step to the process, as well an added expense for the binder. Since binders generally do not participate in the adsorption process, this also lowers the overall capacity, by weight, of the material.

In the method of the invention the crystalline inorganic framework is modified using coatings which provide rate selectivity of one gas over others. Rate selectivity refers to one gas (e.g. $N_2$) diffusing into the micropores of the adsorbent at a faster rate than another gas (e.g. $CH_4$). In this case, the internal surfaces of the crystalline inorganic framework are kinetically selective for $N_2$ adsorption over $CH_4$. The pore size apertures of most microporous materials are generally in the range of 2 to 10 Å, which is also the range of kinetic diameters of most of the gas compounds which may be separated. As discussed above, modifying the pore size of a zeolite to affect gas separation has historically been achieved by exchanging the extra framework cations. For example, zeolite A has a pore aperture size of ~4 Å when possessing a Na cation. Exchanging this cation with potassium or calcium will subsequently change the pore aperture size to ~3 or 5 Å, respectively. Cation exchanges have proven to be very effective for size separating certain gases whose size falls on either side of the pore aperture size created by the ion exchange. For example, 4 Å, with a pore size of ~4 Å, can readily adsorb water vapor, $CO_2$, and CO which have kinetic diameters of 2.65, 3.30, and 3.76 Å, respectively. However, an ion exchange with potassium, which results in a pore aperture size of ~3 Å, would make the zeolite continue to readily adsorb water vapor, but not $CO_2$ or CO which have kinetic diameters larger than the pore aperture size of potassium A. Unfortunately, ion exchanges have limitations when attempting to size separate gases which are closely sized and between 3 and 4 Å.

In the method of the invention the pores of a suitable crystalline inorganic framework such as a zeolite are modified in that the silicone precursor used in the present invention is suspected to react with species on the crystal or crystallite surfaces, including the hydroxyl groups. After calcination at temperatures around 600° C., the silicone-derived species substantially remains deposited on the zeolite crystal or crystallite surface and modifies its' apparent pore size. In addition to acting as a pore modifier, the quantity of silicone resin required to effectively reduce the pore is also sufficient enough to act as a binding agent for the composition, enabling agglomerated-coated particles to be produced in a single step, without any additional components needed. In the examples, there are two variables in the formulation and treatment of the material. The first variable is the amount of silicone resin coating on the zeolite A powder and the second variable relates to the different heat treatment conditions.

The adsorbent of the present invention is made using the following steps (1) selecting a crystalline inorganic framework powder as synthesized and performing a cation exchange, if necessary, to create a pore size aperture which is slightly larger than the intended adsorbed component, (2) combining the crystalline inorganic framework powder with an appropriate amount of silicone resin emulsion and forming additives, if required, (3) shaping the mixture into larger agglomerates including beads, extrudates, pellets, and (4) calcining the agglomerates at conditions which are appropriate for producing the intended pore aperture size and binding strength. The steps of the method of the invention are described in greater detail below for a zeolite embodiment, which is a preferred class of crystalline inorganic framework.

(1) Zeolite and Cation Selection

The properties that are significant for the selection of the zeolite crystallites that meet the requirements of the present invention are the size of the pore apertures, which need to be slightly larger than the smallest component to be adsorbed since the method of the invention is designed to reduce pore size still further. Separating gases in the 3 to 4 Å range requires a zeolite having an initial pore aperture of around 4 Å. In this case, sodium A zeolite is the most convenient and cost effective. However, other precursor frameworks can be considered. Ideally, the structure would have a high internal pore volume to maximize adsorption. The cation form is chosen such that it allows for manipulation of equilibrium characteristics and apparent pore size. Other factors include crystal or crystallite morphology and surface chemistry, since successful coating relies on depositing and retaining silicone derived species on the crystal or crystallite surfaces.

While small pore zeolites including but not limited to A-type zeolites are preferred, other zeolite can be employed in the context of this invention. Different zeolites types have the advantage of different pore size apertures and pore volume.

Additionally, the use of different cations for a given zeolite type is within the scope of this invention. The use of different cation types can change he apparent pore size and subsequently change the gas selectivity. In addition, different cations can create different overall adsorption capacities for certain gases. Cations within the scope of this invention include, but are not limited to Li, Na, K, Mg, Ca, Sr, Ba, Ag, Cu, Zn, and their mixtures.

(2) Combining Zeolite Powder with Silicone Precursor and Additives

This step involves combining the zeolite powder with the silicone precursor and any additional processing additives. The type and amount of the silicone employed as well as the mixing method play an important role in the quality of the silicone derived coating. Depending on the coating type, heat treatment, and gases to be separated, the amount of coating-binder used is generally ranges from about 3 to 15%, in another embodiment from about 3-10% and in yet another embodiment from about 3-5%. Note that this range is measured in terms of the final (after calcination) silicone-derived species contained in the product. This was determined using the McBain $O_2$ test method, which is a most effective method for determining the fractional zeolite content of a bound zeolite relative to its' unbound crystalline powder analog. It measures the absolute micropore volume in terms of the amount of oxygen adsorbed at low temperature and pressure (see patent U.S. Pat. No. 7,455,718 and Bolton, A. P., "Molecular Sieve Zeolites," in Experimental Methods in Catalytic Research, Vol. II, ed. R. B. Anderson and P. T. Dawson, Acedemic Press, New York, 1976). For example, the fractional content of Example 5 was determined by comparing its' $O_2$ adsorption relative to 4 A powder. Both materials were placed in the McBain apparatus and slowly dehydrated and activated under evacuation overnight, i.e. at a pressure of about $1*10<-4>$ torr. Activation occurs as the temperature is ramped from ambient to about 400° C. for approximately eight hours and then held at this temperature for an additional eight hours. The samples are then cooled to liquid $N_2$ temperature (77K) and ultra-high purity $O_2$ is introduced and maintained at a pressure of 70 torr until equilibrium is reached. The amount of $O_2$ adsorbed (wt %) is determined gravimetrically through an accurate measurement of the change in length of a calibrated helical spring. In this example, the 4 Å powder adsorbed 23.5 wt % $O_2$ while the coated material (Example 5) adsorbed 22.3%. This equates to a 5% adsorption reduction and is attributed to the silicone derived coating. For pore sizes wherein $O_2$ is not adsorbed, the McBain method can be modified to use a gas able to be adsorbed by both the parent and coated structures.

In one embodiment, the zeolite crystal or crystallite coating process is carried out in the powder form immediately preceding, or in conjunction with the agglomeration process. It is important to evenly disperse the silicone precursor/coating on the crystals or crystallites to achieve the greatest selectivity possible. Mixers which incorporate higher shear are most effective for dispersion. A plow type mixer was employed in the examples. In some forming processes such as extrusion, combustible process and/or green strength aids are required. The preferred crystals or crystallites are compatible with such aids including celluloses, methylcelluloses, polyvinyl alcohols, and related products. It is preferred that the contents of these aids be minimized with amounts less than about 3% by weight recommended.

The silicone can be coated on the zeolite powder in several ways:
1. The silicone is dissolved in solvent then added to zeolite powder;
2. A solution of the silicone can be added to the zeolite powder
3. The silicone is emulsified (preferably in water) and added to the zeolite powder.

(3) Shaping the Mixture into Agglomerates

Following the zeolite selection and mixing with the silicone precursor and any desired additives, an agglomeration method is used to form particles generally in a range of from about 0.5 to 5.0 mm in size. The crystals or crystallites are compatible with several different forming methods including pan-granulation, extrusion, nauta and other agglomeration methods. In general, beaded products are preferred for the reasons of packing efficiency, less risk of fluidization, and improved crush strength. A properly dispersed coating-binder and any additives during the mixing process is important to achieve agglomerates of good bulk density, shape, and final product crush strength and attrition resistance.

(4) Calcining the Agglomerates

The final step is the calcining of the "green" agglomerates, which simultaneously achieves several results. First, calcination of the zeolite beads removes any volatile organic components from the silicone-derived coating which converts into predominantly silica when heated in an atmosphere containing oxygen. This conversion into silica serves to add a layer to the external surface of the zeolite pore mouth and reduce its' apparent pore size. As shown in the examples, increasing the calcination temperature from 550° C. to 750° C., in another embodiment 550° C. to 650° C. also serves to decrease the apparent pore size though the same amount of coating is initially used. This surprising result supplies another variable which can change the apparent pore size to suit a particular gas separation. At the same time, calcining through these temperatures results in an increasing bead crush strength and attrition resistance properties, which is another surprising result. These temperatures are also sufficient to remove almost all organic processing additives from the final product. Finally, the calcination step also serves to activate the material, i.e. remove the water and/or any other removable species, which is necessary to allow the zeolite to maintain a high capacity for the adsorbable gas. Of course, it is known in the art that elevated calcination temperatures must be well controlled to avoid any adsorption performance degradation. This includes using a good quality purge gas and staging a gradual rise to the final temperature to slowly remove the removable components and avoid degradation.

The use of dry air for heat treatment was given in the examples. However, dry oxygen or a mixture of gases containing oxygen could be used for this calcination step.

The invention will now be exemplified by the following non-limiting examples. In the examples, the data produced demonstrated the rate size separation of nitrogen and methane. There are numerous other potential gas separations which can be accomplished by the adsorbents of the present invention, such as oxygen and argon, $N_2$/Ar from air, $CO_2$ from $N_2$, and $CO_2$ from natural gas among others.

Example 1. NaA Commercial Zeolite Adsorbent with 12% Clay Binding Agent, Commercial Scale Preparation A commercial NaA adsorbent product was obtained from Zeochem LLC, in 1.0 mm average bead size. The product contains 12 wt. % of a clay binding agent.

Example 2. 4 A Zeolite Adsorbent with 2.5 wt. % Silicone-Derived Species, Calcined at 540° C.

500.0 g of zeolite 4 A powder on a dry weight basis (632.9 g wet weight) was placed in a Hobart mixer. While the mixer was agitated, a mixture of 40.1 g of IE-2404 (a silicone containing silicone resin emulsion from Dow Corning), 42.9 g. Optapix-35 (a solution with 35 wt % PolyVinyl Alcohol in water), and 45.0 g. deionized water was pumped in at a rate of 5.0 ml/min. After the addition was completed, mixing was continued for an additional ½ hour. Thereafter, an additional 140 g. of deionized water was slowly added to form beads having porosity in the 30 to 40% range, as measured after calcination using a Micromeritics Autopore IV Hg porosimeter. At the end of this mixing time, beads including those in the target 12×18 U.S. mesh range had formed. The product beads were air dried overnight prior to calcination using a shallow tray method at temperatures up to 540° C. The shallow tray calcination method used a General Signal Company Blue-M electric oven equipped with a dry air purge. ~100 g. dry wt. of the 12×18 U.S. mesh adsorbent were spread out in a stainless steel mesh tray to provide a thin layer. A purge of 200 SCFH of dry air was fed to the oven during calcination. The temperature was set to 90° C., followed by a 6 hour dwell time. The temperature was then increased to 200° C. gradually over the course of a 6 hour period, and further increased to 300° C. over a 2 hour period and finally increased to 540° C. over a 3 hour period and held there for 1 hour before cooling to 450° C. after which the adsorbent was removed, immediately bottled in a sealed bottle and placed in a dry nitrogen purged drybox. The calcined beads were rescreened to harvest those particles in the 12×18 U.S. mesh range.

Example 3. 4 A Zeolite Adsorbent with 2.5 wt. % Silicone-Derived Species, Calcined at 595° C.

100 g. of precalcined (green) product beads from Example 2 were used. The product beads were air dried overnight prior to calcination using a shallow tray method at temperatures up to 595° C. The shallow tray calcination method used a General Signal Company Blue-M electric oven equipped with a dry air purge. ~100 g. dry wt. of the 12×18 U.S. mesh adsorbent were spread out in a stainless steel mesh tray to provide a thin layer. A purge of 200 SCFH of dry air was fed to the oven during calcination. The temperature was set to 90° C., followed by a 6 hour dwell time. The temperature was then increased to 200° C. gradually over the course of a 6 hour period, and further increased to 300° C. over a 2 hour period and finally increased to 595° C. over a 3 hour period and held there for 1 hour before cooling to 450° C. after which the adsorbent was removed, immediately bottled in a sealed bottle and placed in a dry nitrogen purged drybox. The calcined beads were rescreened to harvest those particles in the 12×18 U.S. mesh range.

Example 4. 4 A Zeolite Adsorbent with 2.5 wt. % Silicone-Derived Species, Calcined at 650° C.

100 g. of precalcined (green) product beads from Example 2 were used. The product beads were air dried overnight prior to calcination using a shallow tray method at temperatures up to 650° C. The shallow tray calcination method used a General Signal Company Blue-M electric oven equipped with a dry air purge. ~100 g. dry wt. of the 12×18 U.S. mesh adsorbent were spread out in a stainless steel mesh tray to provide a thin layer. A purge of 200 SCFH of dry air was fed to the oven during calcination. The temperature was set to 90° C., followed by a 6 hour dwell time. The temperature was then increased to 200° C. gradually over the course of a 6 hour period, and further increased to 300° C. over a 2 hour period and finally increased to 650° C. over a 3 hour period and held there for 1 hour before cooling to 450° C. after which the adsorbent was removed, immediately bottled in a sealed bottle and placed in a dry nitrogen purged drybox. The calcined beads were rescreened to harvest those particles in the 12×18 U.S. mesh range.

Example 5. 4 A Zeolite Adsorbent with 5.0 wt. % Silicone-Derived Species 500.0 g of zeolite 4 A powder on a dry weight basis (632.9 g wet weight) was placed in a Hobart mixer. While the mixer was agitated, a mixture of 82.2 g of IE-2404 (a silicone containing silicone resin emulsion from Dow Corning), 42.9 g. Optapix-35 (a solution with 35 wt % PolyVinyl Alcohol in water), and 45.0 g. deionized water was pumped in at a rate of 5.0 ml/min. After the addition was completed, mixing was continued for an additional ½ hour. Thereafter, an additional 140 g. of deionized water was slowly added to form beads having porosity in the 30 to 40% range, as measured after calcination using a Micromeritics Autopore IV Hg porosimeter. At the end of this mixing time, beads including those in the target 12×18 U.S. mesh range had formed. The product beads were air dried overnight prior to calcination using a shallow tray method at temperatures up to 595° C. The shallow tray calcination method used a General Signal Company Blue-M electric oven equipped with a dry air purge. ~100 g. dry wt. of the 12×18 U.S. mesh adsorbent were spread out in a stainless steel mesh tray to provide a thin layer. A purge of 200 SCFH of dry air was fed to the oven during calcination. The temperature was set to 90° C., followed by a 6 hour dwell time. The temperature was then increased to 200° C. gradually over the course of a 6 hour period, and further increased to 300° C. over a 2 hour period and finally increased to 595° C. over a 3 hour period and held there for 1 hour before cooling to 450° C. after which the adsorbent was removed, immediately bottled in a sealed bottle and placed in a dry nitrogen purged drybox. The calcined beads were rescreened to harvest those particles in the 12×18 U.S. mesh range.

Example 6. $CH_4$ and $N_2$ Adsorption Rate Tests

Figure 5:
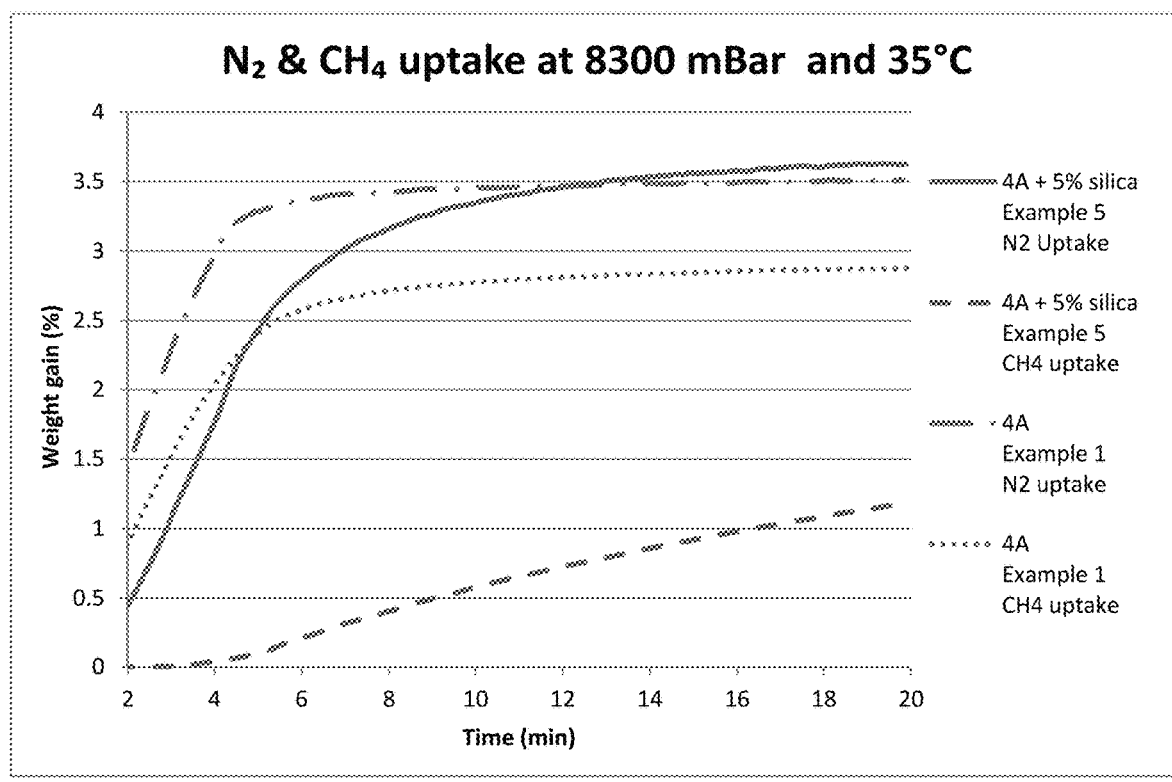
FIG. 5—Shows the isotherms of $N_2$ and $CH_4$ on the 4 A material of Example 1 and the 4 A+5% silicone-derived species material of Example 5.

A method to measure the effectiveness of the coating on the adsorption rate characteristics requires adsorption rate tests. A useful instrument for measuring single gas adsorption is a gravimetric type balance which can measure the amount and kinetics of gas adsorption on materials. For our tests, a Hiden IGA balance (Model #HAS022650) was used to measure the adsorption of $N_2$ and $CH_4$ on the 4 A material in Example 1 and the 4 A+5% silicone derived species in Example 5. The samples were loaded and gas adsorptions were measured as instructed in the IGA Systems User Manual #HA-085-060. Each sample was loaded and activated in situ under vacuum with a temperature ramp of 0.7° C./min to 400° C. and held for 12 hours. It was then cooled to 35° C. at a rate of 1° C./min. The gas ($N_2$ or $CH_4$) was introduced and pressure was increased to 8300 mBar over a 4 minute period and held at that pressure. Each material was tested first for $N_2$, prior to being reactivated before repeating the test using $CH_4$. The results of the 4 loading versus time curves are presented in FIG. 5. It should be noted that the first 2 minutes of each loading versus time curve is unstable as the system stabilizes and useful data is only obtained thereafter. In FIG. 5, the X-axis represents the time at which the material (Example 1 or 5) is exposed to the gas ($N_2$ or $CH_4$) at 8300 mBar and 35° C. The Y-axis represents the % weight gain of the material over the activated weight.

Figure 2:
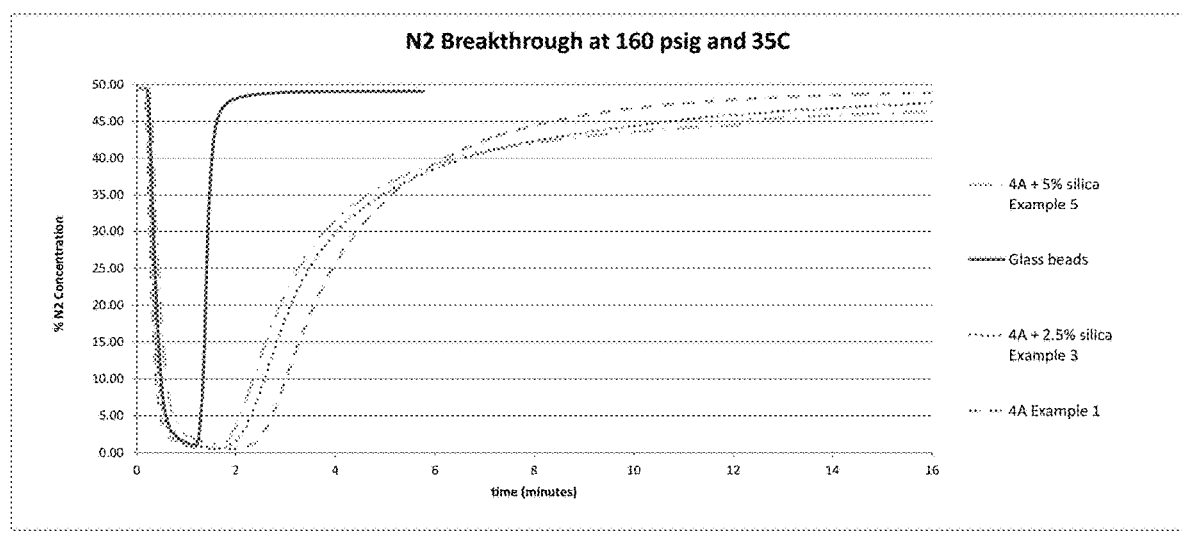
FIG. 2—Shows the $N_2$ breakthrough results of 4 Å, 2.5% silica coated 4 Å, 5% silicone-derived species coated 4 Å, and glass beads as a reference.

As seen as FIG. 5, the effect of coating the 4 A with silicone derived species on the rate of adsorption is quite evident, especially for $CH_4$. While the 5% coating does have a small initial effect on the $N_2$ adsorption, the $N_2$ uptake of the 2 samples become equal after about 12 minutes. In contrast, the effect of the coating is significantly greater on the adsorption of $CH_4$. Whereas the $N_2$ adsorption is equal for both samples after 12 minutes, the $CH_4$ adsorption on the 4 A is about 4 times that of the coated sample from Example 5 (2.8 vs. 0.7%). This result is consistent with the breakthrough test results in which $CH_4$ exhibited a much faster breakthrough (lower uptake) for the coated 4 A with very little change in the $N_2$ curves (FIGS. 1 and 2).

Example 7. $CH_4$ and $N_2$ Breakthrough (Adsorption Rate) Test Procedure

One of the largest benefits of a customizable pore size is the ability to tune the adsorption rate characteristics when exposed to a stream of mixed gases. A lab scale breakthrough test was designed to measure these rate adsorption characteristics on the products from Examples 1-5. Examples 2, 3, and 4 showcase the impact of changing the calcination temperature. Examples 3 and 5 demonstrate the impact of the amount of silicone derived species and example 1 is a commercial comparative sample. A stream of mixed $N_2$ and methane gas was introduced into a bed of material from Examples 1-5 to measure the different rate adsorption characteristics of each material for each gas. The test conditions were kept the same for each material and the test proceeded as follows:

Activate ~100 grams of 12×18 U.S. mesh beads
  Load material using "tap" packing method to maximize packing into 60 cc volume column which serves as the adsorption bed and has valves on each end.
2. Connect the column into the breakthrough system and wrap with heat tape.
3. Flow $N_2$ with 1% He through the bed at 100 cc/min.
4. Heat bed temperature to 100° C. for 1 hour.
5. Drop bed temperature to 35° C. and increase flow to 400 cc/min.
6. Bring system to 160 psig.
7. Isolate the bed while switching feed to 49.5% $N_2$, 49.5% $CH_4$, 1% He
8. Reintroduce bed to flow and analyze effluent until $CH_4$ reaches>48%. The resulting graph of $CH_4$% versus time represents the methane breakthrough (adsorption rate) curve.
9. Re-isolate the bed and switch feed to 99% $CH_4$ 1% He
10. Re-introduce flow to bed and purge for 3 hours to remove remaining $N_2$.
11. Isolate the bed while switching feed to 49.5% $N_2$, 49.5% $CH_4$, 1% He
12. Reintroduce bed to flow and analyze effluent until $N_2$ reaches>48%. The resulting graph of $N_2$% versus time represents the $N_2$ breakthrough (adsorption rate) curve.

The breakthrough test as described in Example 7 is an effective tool for measuring the adsorption rate characteristics of selected material when exposed to a stream of mixed gases. The material produced in Examples 1, 3, and 5 were individually tested and compared using the breakthrough test described in Example 7.

As seen in FIG. 1, the breakthrough time of methane is progressively faster as we increase the coating from 0 to 5% silicone derived species. This represents a lower adsorption rate for material containing a higher coating content, which is due to reduction in pore size. A bed containing glass beads was also used as a reference to represent a material which adsorbs no gas. In fact, by 5% silicone derived species coating content, the $CH_4$ breakthrough is quite close to glass beads, which indicates very little adsorption.

As seen in FIG. 2, the breakthrough time of $N_2$ is also somewhat faster as we increase the coating from 0 to 5% silica using the silicone resin. However, unlike the change in methane, the decrease in breakthrough time for $N_2$ is much less with increasing coating amount.

Selectivity is a common means for expressing separation efficiency. One method for measuring selectivity is to compare the time in which the breakthrough begins for $N_2$ and $CH_4$ using the breakthrough data. The method for quantifying the adsorption rate selectivity change of different examples is to compare the % concentration at a specific time. The 6 minute time point was selected to eliminate any slope impact from slow adsorption of any one gas. The data in Table 1 shows the adsorbed gas concentration at the 6 minute point for samples from Example 1, 3, and 5 as a % below the concentration of that gas in the feed stream. By way of illustration, for the Example 1 sample, the % $CH_4$ concentration in the effluent stream at 6 minutes is measured at 15%. This value is 70% below the concentration in the feed stream (50%) and is recorded as 70% concentration retained in the bed.

TABLE 1

Concentration (%) retained in bed after 6 minutes of select examples

| | | Concentration (%) retained in bed at 6 min. | | |
|---|---|---|---|---|
| | Material | $N_2$ | $CH_4$ | $N_2/CH_4$ ratio |
| Example 1 | 4A beads | 22 | 70 | 0.31 |
| Example 3 | 4A beads + 2.5% silicone derived species | 22 | 42 | 0.52 |
| Example 5 | 4A beads + 5% silicone derived species | 22 | 18 | 1.22 |

The data in Table 1 shows that the concentration of $N_2$ retained in the bed after 6 minutes are the same at 22% for all 3 samples. However, at that same time, the amount of $CH_4$ retained decreases significantly as the coating is increased from 0 to 5%. The 3rd column in Table 1 calculates the ratio of the concentrations, $N_2/CH_4$, with a higher amount indicating increased adsorption rate selectivity. This data agrees well with the data on the Hiden IGA balance, where the selectivity also increased 4 times when the coating is increased from 0 to 5%.

The material produced in Examples 2, 3, and 4 were each individually tested and compared using the breakthrough test described in Example 7.

Figure 3:
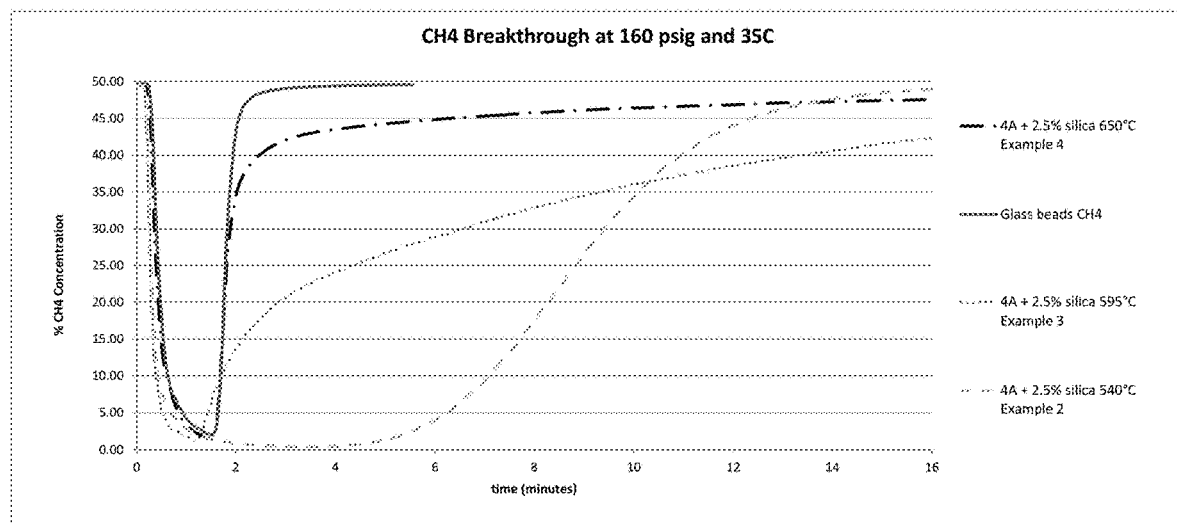
FIG. 3—Shows $CH_4$ breakthrough results of 2.5% silicone-derived species coated 4 A at calcination temperatures of 540° C., 595° C., and 650° C., and glass beads as a reference.

As seen from FIG. 3, the effect of the different calcination temperatures is significant on the breakthrough times of methane. This surprising result can most likely be attributed to the fact that with the IE-2404 silicone precursor, a 540° C. calcination temperature does not sufficiently change the pore size of the 4 A. As the temperature is increased to 595° C., and especially 650° C., there are further reactions taking place which leads to more pore size reduction from coating with the silicone derived species. In fact, the $CH_4$ breakthrough at 650° C. indicates a very fast breakthrough, signaling a very low adsorption. In order to achieve the desired selectivity the optimum calcining temperatures may vary slightly depending on the silicone precursor selected.

Figure 4:
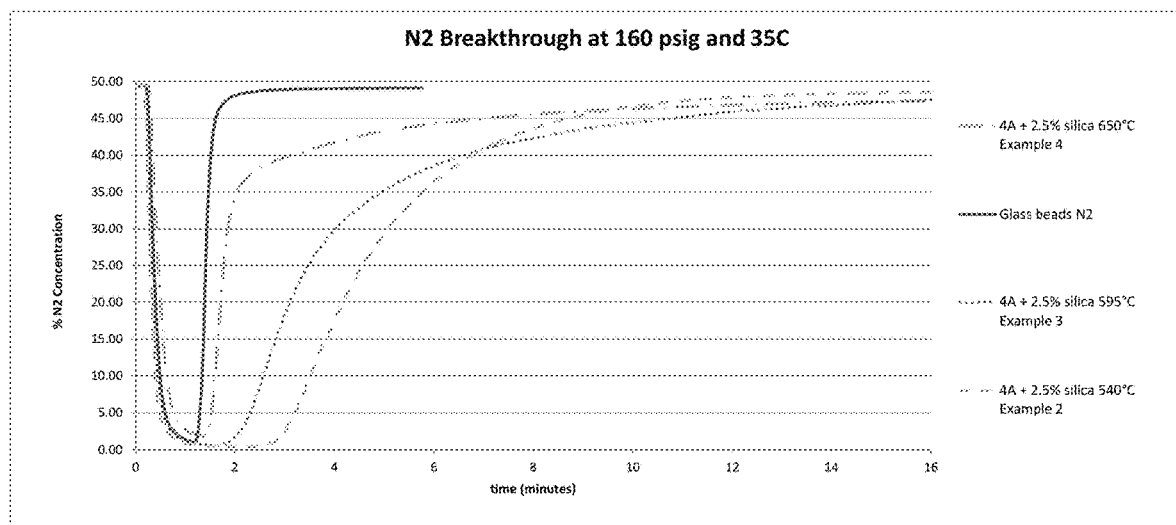
FIG. 4—Shows $N_2$ breakthrough results of 2.5% silicone-derived species coated 4 A at calcination temperatures of 540° C., 595° C., and 650° C., and glass beads as a reference.

As seen in FIG. 4, the $N_2$ breakthrough time increases appreciably from samples calcined at 650° C. versus 540° C. Similarly to the reasoning for the $CH_4$ breakthrough curves, the increase is due to less pore size change with lower calcination temperatures.

TABLE 2

Concentration (%) retained in bed after 6 minutes of select examples

|  | Material | Concentration (%) retained in bed at 6 min. | | $N_2/CH_4$ ratio |
|---|---|---|---|---|
|  |  | $N_2$ | $CH_4$ |  |
| Example 2 | 4A beads + 2.5% silicone derived species 540 C. calcination | 28 | 92 | 0.30 |
| Example 3 | 4A beads + 2.5% silicone derived species 595 C. calcination | 22 | 42 | 0.52 |
| Example 4 | 4A beads + 2.5% silicone derived species 650 C. calcination | 12 | 10 | 1.20 |

The data in Table 2 shows that the calcination temperature has a significant effect on the concentration % of $CH_4$ retained in the bed after 6 minutes. In fact, at 650° C. calcination temperature the retained percentages of $N_2$ and $CH_4$ are both close to 0%. Note that while the $N_2/CH_4$ ratio (selectivity) is nearly identical to Example 5, the lack of $N_2$ adsorption is probably too low for this example to be effective in $N_2/CH_4$ separation. Finally, the Example 2 material, which is coated, has a higher $CH_4$ retention than the uncoated 4 A (Example 1) after 6 minutes. Without wishing to be bound to any particular theory, it is believed that the reason for this is because the uncoated 4 A beads contain significantly more binder (12%) versus 2.5% for Example 2, which in itself lowers the adsorption capacity for all gases.

We claim:

1. A surface modified A-type zeolite adsorbent having a starting effective pore size of less than or equal to 4.1 Å wherein the starting pore size of said zeolite is reduced by 0.1 up to about 1.2 Å with a coating comprised of a silicone derived species, wherein said species is derived from a silicone precursor of formula I:

$[(R)_2SiO]n$ or of formula II:

$RSiO_{1.5}$ wherein each R substituent is the same or different and is selected from a substituted or unsubstituted organic compound.

2. The adsorbent of claim 1 wherein said adsorbent is shaped into agglomerates, beads, extrudates, or pellets.

3. The adsorbent of claim 1 wherein said A-type zeolite is exchanged with one or more cations selected from Li, Na, K, Mg, Ca, Sr, Ba, Ag, Cu, or Zn.

4. The adsorbent of claim 1 wherein each R is the same or different and is selected from H, straight, branched or cyclic, substituted or unsubstituted, $C_1$ to $C_8$ alkyl, alkenyl, alkynyl, alkoxy and aryl.

5. The adsorbent of claim 1 wherein each R is the same or different and is selected from linear, branched and cyclic compounds $C_1$ to $C_4$ organic compounds.

6. The adsorbent of claim 1 wherein the silicone precursor is polymeric or oligomeric and each R is independently terminated by hydroxy, methoxy, ethoxy or combinations thereof.

7. The adsorbent of claim 1 wherein the silicone precursor is selected from hydroxy, methoxy, or ethoxy terminated polymeric di-methylsiloxane, methyl-silsesquioxanes, octyl-silsesquioxanes, methyl octyl-silsesquioxanes or combinations or mixtures thereof.

8. The adsorbent of claim 1 wherein said silicone precursor is selected from polydimethylsiloxanes, polydiphenylsiloxanes, octyl silsesquioxanes methyl silsesquioxanes, (2,4,4-trimethylpentyl) triethoxysilane and mixtures thereof.

9. The adsorbent of claim 1 wherein said silicone precursor is identified by one or more of the following Chemical Abstracts Service (CAS) Registry Numbers: CAS Registry Numbers 63148-62-9, CAS Registry Numbers 63148-59-4, CAS Registry Number of 897393-56-5; CAS Registry Number of 68554-66-5; CAS Registry Number 35435-21-3, and combinations thereof.

10. The adsorbent of claim 1 which comprises from about 2 to about 15% by weight of said silicone derived species.

11. An adsorbent composition for separation of at least 2 gases or liquids wherein there is a size difference between the molecules of said gases or liquids to be separated of 0.8 Å or less, wherein said adsorbent composition is an agglomerated product comprising a surface modified A-type zeolite adsorbent having a starting effective pore size of less than or equal to 4.1 Å wherein the starting pore size of said zeolite is reduced by 0.1 up to about 1.2 Å with a coating comprised of a silicone precursor selected from polydimethylsiloxanes, polydiphenylsiloxanes, octyl silsesquioxanes methyl silsesquioxanes, (2,4,4-trimethylpentyl) triethoxysilane and mixtures thereof, wherein said adsorbent has a particle size of from 0.5-5 mm and a crush strength of at least 0.7 lbF.

12. An adsorption process for adsorbing or separating a first adsorbable component from a gaseous mixture comprising at least a second adsorbable component, wherein the first adsorbable component has a kinetic diameter that is larger than the second adsorbable component and wherein the difference in kinetic diameter between said two adsorbable components is from about 0.1 to about 0.80 Å, said process comprising contacting the mixture with an adsorbent material which selectively adsorbs the second adsorbable component allowing said first adsorbable component to be recovered as product, said process comprising contacting said gaseous mixture with the surface modified zeolite adsorbent composition of claim 1, such that said zeolite selectively adsorbs said second adsorbable component and not said first adsorbable component.

13. The process of claim 12 wherein said first adsorbable component is $CH_4$ and said second adsorbable component is $N_2$.

14. The process of claim 12 wherein said first adsorbable component is CO and said second adsorbable component is $CO_2$.

15. The process of claim 12 wherein said first adsorbable component is $N_2$ and said second adsorbable component is $CO_2$.

16. The process of claim 12 wherein said first adsorbable component is $N_2$ and said second adsorbable component is $O_2$.

* * * * *